United States Patent
Dohi et al.

(10) Patent No.: US 8,157,702 B2
(45) Date of Patent: Apr. 17, 2012

(54) CONTROL APPARATUS FOR AUTOMATIC TRANSMISSION

(75) Inventors: Koji Dohi, Machida (JP); Minari Ishii, Fujisawa (JP); Daisuke Aoki, Yamato (JP)

(73) Assignee: Jatco Ltd, Fuji-shi (JP)

( * ) Notice: Subject to any disclaimer, the term of this patent is extended or adjusted under 35 U.S.C. 154(b) by 88 days.

(21) Appl. No.: 12/841,510

(22) Filed: Jul. 22, 2010

(65) Prior Publication Data

US 2011/0048552 A1 Mar. 3, 2011

(30) Foreign Application Priority Data

Aug. 25, 2009 (JP) ................................. 2009-194036

(51) Int. Cl.
*B60W 10/02* (2006.01)
*B60W 10/10* (2012.01)
(52) U.S. Cl. ........................................... 477/76; 477/79
(58) Field of Classification Search .................... 477/70, 477/76, 77, 79
See application file for complete search history.

(56) References Cited

U.S. PATENT DOCUMENTS

| 5,542,888 | A | 8/1996 | Takada et al. |
| 7,229,384 | B2 * | 6/2007 | Kuepper .......................... 477/77 |
| 2003/0232696 | A1 * | 12/2003 | Shibagaki ........................ 477/76 |
| 2008/0125284 | A1 * | 5/2008 | Tanaka et al. ................... 477/39 |

FOREIGN PATENT DOCUMENTS

| JP | 07-167283 A | 7/1995 |
| JP | 2004-036668 A | 2/2004 |

* cited by examiner

*Primary Examiner* — Edwin A Young
(74) *Attorney, Agent, or Firm* — Foley & Lardner LLP

(57) ABSTRACT

A control apparatus for an automatic transmission including a hydraulic pressure control means for controlling supply of hydraulic pressure to a first friction engagement element and a second friction engagement element and discharge of hydraulic pressure from the first friction engagement element and the second friction engagement, and a discharge rate changeover control means for increasing a discharge rate value of the hydraulic pressure which is discharged from the first friction engagement element in a case where when shifting from one of operating ranges to the other thereof is selected, changeover to the other operating range is carried out before completing release of the first friction engagement element, so as to become larger than a discharge rate value of the hydraulic pressure which is discharged from the first friction engagement element before the changeover to the other operating range is carried out.

10 Claims, 7 Drawing Sheets

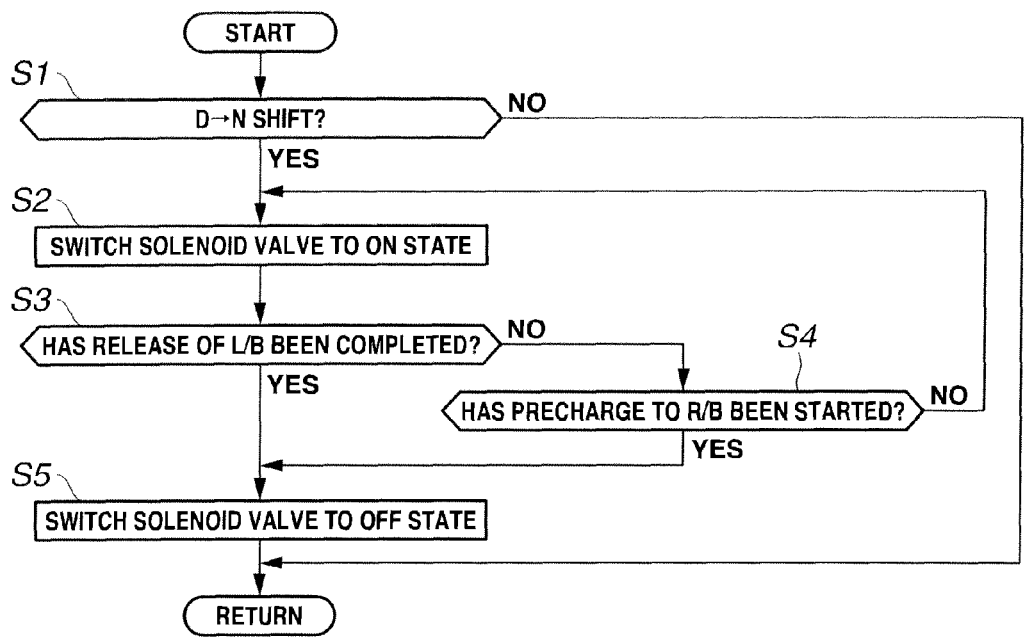
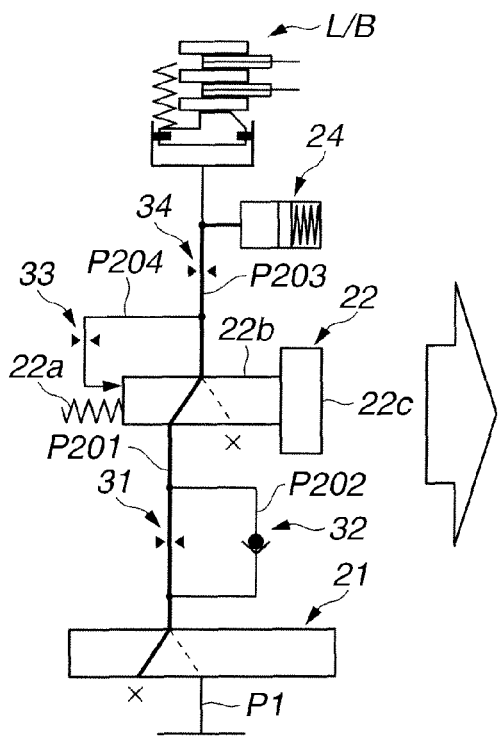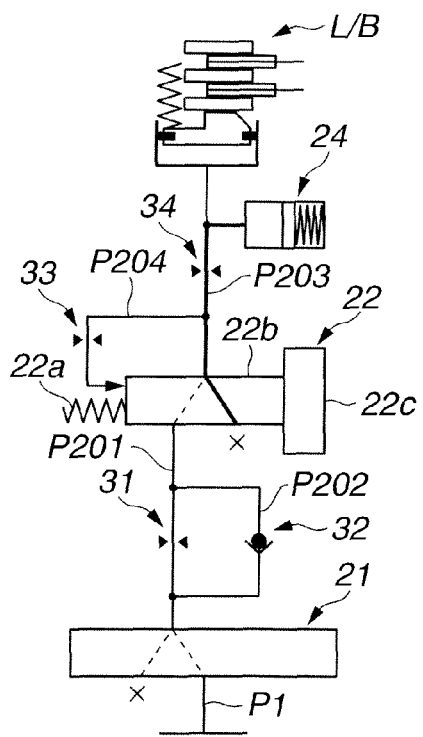

CONTROL APPARATUS FOR AUTOMATIC TRANSMISSION

BACKGROUND OF THE INVENTION

The present invention relates to a control apparatus for an automatic transmission.

Japanese Patent Application Unexamined Publication No. 2004-36668 discloses an automatic transmission which is controlled such that upon releasing a friction engagement element, a hydraulic pressure in the friction engagement element is discharged via an orifice in order to slowly discharge the hydraulic pressure.

SUMMARY OF THE INVENTION

However, in the automatic transmission of the above-described conventional art, for instance, when shifting from a forward drive range to a reverse drive range is quickly selected, or when shifting from the forward drive range to the reverse drive range is selected under the condition that a discharge rate of an oil is relatively low due to a low temperature of the oil, a friction engagement element to be engaged in the reverse drive range may be supplied with a hydraulic pressure before a hydraulic pressure in a friction engagement element kept in an engaged state in the forward drive range is completely discharged therefrom, that is, so-called interlock tends to occur.

The present invention has been made in view of the above problem in the conventional art. It is an object of the present invention to provide a control apparatus for an automatic transmission which is capable of performing stable shifting between operating ranges regardless of a manner of the selecting operation or the environment.

In one aspect of the present invention, there is provided a control apparatus for an automatic transmission including a first friction engagement element that is brought into an engagement state upon selecting one of operating ranges including a forward drive range and a reverse drive range and brought into a release state upon selecting the other of the operating ranges, and a second friction engagement element that is brought into a release state upon selecting the one of the operating ranges and brought into an engagement state upon selecting the other of the operating ranges, the control apparatus comprising:

a hydraulic pressure control means for controlling supply of hydraulic pressure to the first friction engagement element and the second friction engagement element and discharge of hydraulic pressure from the first friction engagement element and the second friction engagement; and a discharge rate changeover control means for increasing a discharge rate value of the hydraulic pressure which is discharged from the first friction engagement element in a case where when shifting from the one of the operating ranges to the other of the operating ranges is selected, changeover to the other of the operating ranges is carried out before completing release of the first friction engagement element, so as to become larger than a discharge rate value of the hydraulic pressure which is discharged from the first friction engagement element before the changeover to the other of the operating ranges is carried out.

The present invention has the following effects. In a case where a quick selecting operation is carried out or in a case where a selecting operation is carried out under a condition that a discharge rate of the oil is low due to a low temperature of the oil, a discharge rate of the hydraulic pressure from the first friction engagement element from which the oil is to be discharged can be increased to thereby suppress occurrence of an interlock.

BRIEF DESCRIPTION OF THE DRAWINGS

FIG. 4 is a flowchart showing a routine of discharge rate changeover control according to the first embodiment.

FIGS. 5A and 5B are schematic diagrams showing hydraulic pressure discharging routes, respectively, in a case where the discharge rate changeover control according to the first embodiment is carried out.

DETAILED DESCRIPTION OF THE INVENTION

[First Embodiment]

Figure 1:
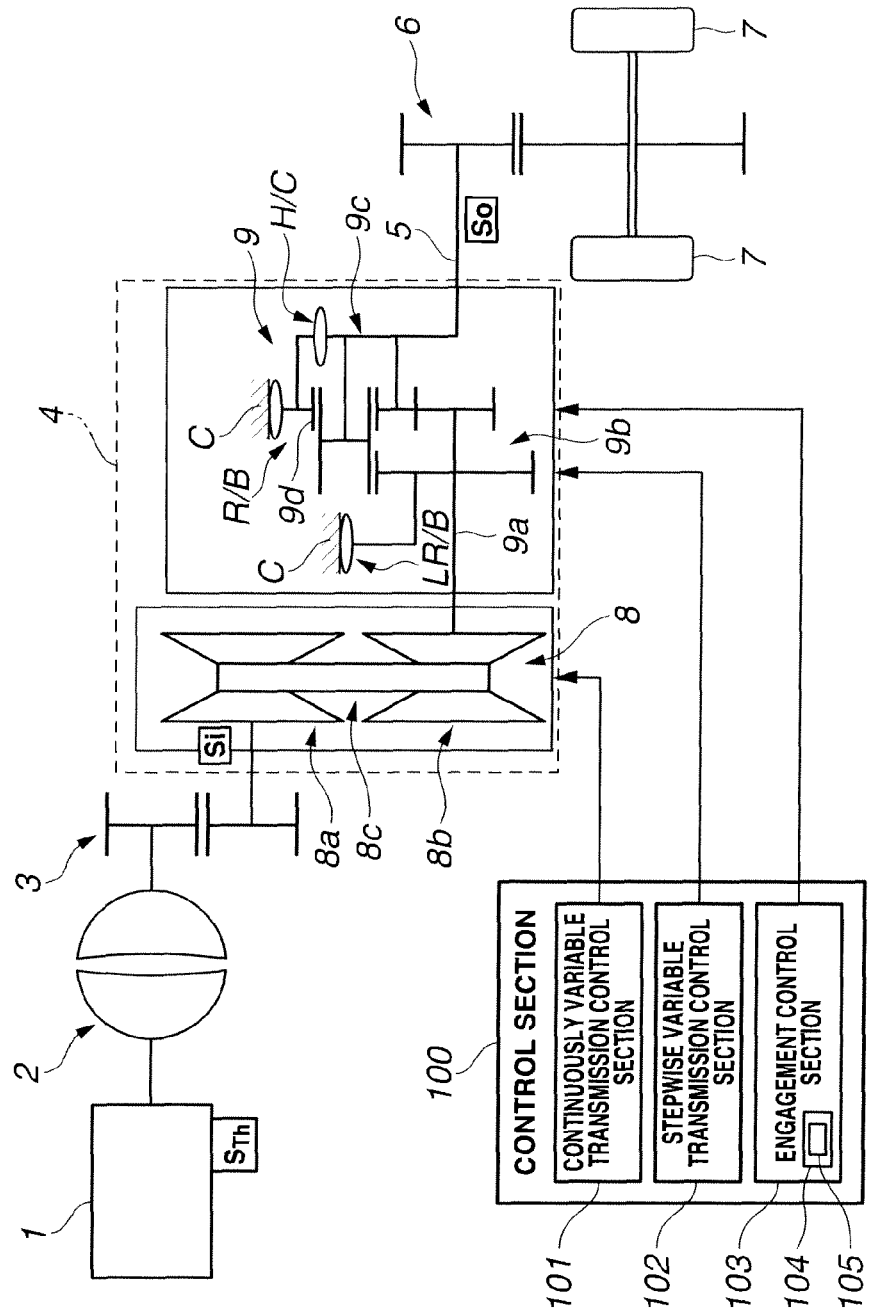
FIG. 1 is a schematic diagram showing a power train of an automatic transmission to which an apparatus according to a first embodiment of the present invention is applied.

FIG. 1 is a schematic diagram showing a power train in which a control apparatus for an automatic transmission, according to a first embodiment of the present invention, is installed. As illustrated in FIG. 1, the power train includes engine 1 as a drive source, torque converter 2 drivingly connected to engine 1, automatic transmission 4 drivingly connected to torque converter 2 via reduction mechanism 3, final drive gear mechanism 6 drivingly connected to automatic transmission 4 via transmission output shaft (i.e., propeller shaft) 5, and road wheels 7 to which a power from automatic transmission 4 is outputted via final drive gear mechanism 6. The automatic transmission 4 is constituted of continuously variable transmission mechanism 8 and auxiliary transmission mechanism 9.

Continuously variable transmission mechanism 8 is a known belt-drive continuously variable transmission mechanism and includes drive pulley 8a connected to an output shaft of reduction mechanism 3, driven pulley 8b connected to input shaft 9a of auxiliary transmission mechanism 9, and belt 8c that is disposed between drive pulley 8a and driven pulley 8b so as to connect drive pulley 8a and driven pulley 8b with each other. Drive pulley 8a and driven pulley 8b are supplied with oil and operative to vary a width of each of pulleys 8a and 8b in accordance with a hydraulic pressure of the oil to be supplied thereto. Thus constructed continuously variable transmission mechanism 8 can vary a transmission ratio in a non-stepwise, i.e., continuous manner, by controlling a hydraulic pressure to be supplied to drive pulley 8a and a hydraulic pressure to be supplied to driven pulley 8b.

Auxiliary transmission mechanism 9 is a stepwise variable transmission and includes a Ravigneaux planetary gear set including compound sun gear 9b as an input member to which driven pulley 8b of continuously variable transmission mechanism 8 is drivingly connected, and carrier 9c as an output member which is drivingly connected to transmission output shaft 5. Sun gear 9b is fixed to casing C via low brake L/B. Carrier 9c is drivingly connected to ring gear 9d via high clutch H/C. Ring gear 9d is fixed to casing C via reverse brake R/B.

brake L/B, high clutch H/C and reverse brake R/B can be supplied with oil and thereby brought into an engagement state and a release (or disengagement) state, respectively, in accordance with a hydraulic pressure of the oil to be supplied. Thus constructed auxiliary transmission mechanism 9 can select forward first speed, forward second speed and reverse speed by controlling the hydraulic pressure to be supplied to low brake L/B, high clutch H/C and reverse brake R/B.

In a case where the forward first speed is selected, low brake L/B is brought into the engagement state, and at the same time, high clutch H/C is brought into the release state. In a case where the forward second speed is selected, low brake L/B is brought into the release state, and at the same time, high clutch H/C is brought into the engagement state. An engagement/release schedule for the hydraulic pressure control in auxiliary transmission mechanism 9 is shown in Table 1 as follows.

TABLE 1

|  | L/B | H/C | R/B |
| --- | --- | --- | --- |
| First Speed | ○ | X | X |
| Second Speed | X | ○ | X |
| Reverse Speed | X | X | ○ |

The vehicle equipped with automatic transmission 4 includes shift control section 100 that is provided in transmission controller 11 (see FIG. 2) for performing shift control of automatic transmission 4. Shift control section 100 includes continuously variable transmission control section 101 which is configured to calculate a target input rotation number (or target input speed) of automatic transmission 4 and continuously controls a transmission ratio of continuously variable transmission mechanism 8 on the basis of the target input speed, and stepwise variable transmission control section 102 which is configured to calculate a target speed (or target gear stage) of auxiliary transmission mechanism 9 and control a speed of auxiliary transmission mechanism 9 so as to achieve the target speed. That is, automatic transmission 4 as a whole can realize a target transmission ratio by cooperating shift control of continuously variable transmission mechanism 8 and shift control of auxiliary transmission mechanism 9 with each other. Shift control section 100 further includes engagement control section 103 which is configured to smoothly bring the corresponding friction engagement element (low brake L/B, reverse brake R/B or the like) into engagement and controls change in discharge rate of a hydraulic pressure in the release side friction engagement element when the vehicle driver shifts a selector lever (not shown) from a forward drive range to a reverse drive range or from the reverse drive range to the forward drive range. Engagement control section 103 will be explained in detail later.

Figure 2:
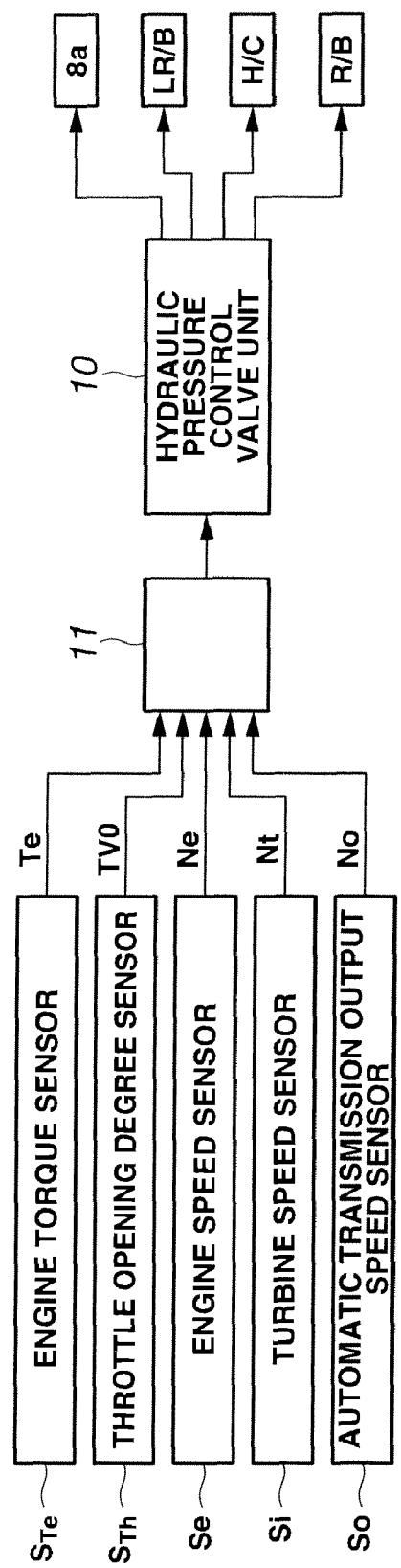
FIG. 2 is a block diagram showing a control system of the first embodiment.

Continuously variable transmission mechanism 8 is constructed to control the hydraulic pressure to be supplied to drive pulley 8a and the hydraulic pressure to be supplied to driven pulley 8b (usually, only the hydraulic pressure to be supplied to drive pulley 8a) by controlling a plurality of solenoid valves built in hydraulic pressure control valve unit 10 as shown in FIG. 2 so as to switch between the ON state and the OFF state. Thus constructed continuously variable transmission mechanism 8 can continuously vary the transmission ratio. Similarly, auxiliary transmission mechanism 9 is constructed to control the hydraulic pressure to be supplied to low brake LR/B, the hydraulic pressure to be supplied to high clutch H/C and the hydraulic pressure to be supplied to reverse brake R/B by controlling a plurality of solenoid valves built in hydraulic pressure control valve unit 10 so as to switch between the ON state and the OFF state. Thus constructed auxiliary transmission mechanism 9 can select the forward first speed or the forward second speed.

As shown in FIG. 2, hydraulic pressure control valve unit 10 is controlled by transmission controller 11. Transmission controller 11 is electrically connected with, for instance, engine torque sensor Ste which detects engine torque Te, throttle opening degree sensor $S_{Th}$ which detects throttle opening degree TVO, engine speed sensor Se which detects output revolution number (hereinafter referred to simply as "engine speed") Ne of engine 1, turbine speed sensor Si which detects input rotation number Ni of automatic transmission system 4, and automatic transmission output speed sensor So which detects rotation number No of transmission output shaft 5 (hereinafter referred to as "automatic transmission output shaft rotation number"). A signal from engine torque sensor Ste, a signal from throttle opening degree sensor $S_{Th}$, a signal from engine speed sensor Se, a signal from turbine speed sensor Si and a signal from automatic transmission output speed sensor So are inputted to transmission controller 11.

[Construction of Hydraulic Pressure Control Valve Unit]

Figure 3:
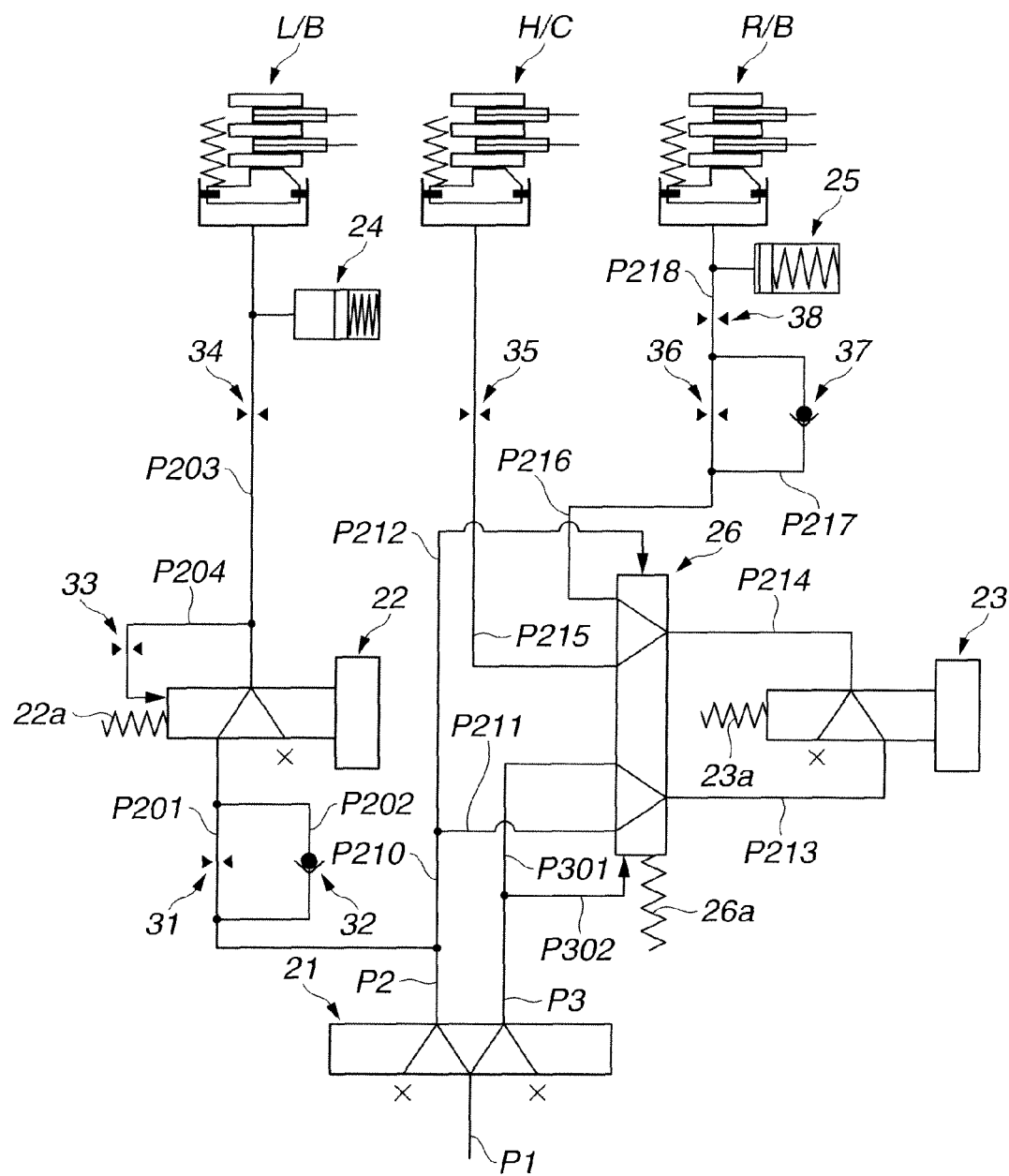
FIG. 3 is a hydraulic circuit diagram showing a construction of a hydraulic control valve unit of the first embodiment.

Next, the construction of hydraulic pressure control valve unit 10 is explained. FIG. 3 is a hydraulic pressure circuit diagram showing the construction of hydraulic pressure control valve unit 10 of the apparatus according to the first embodiment. A hydraulic pressure outputted from an oil pump (not shown) is regulated to a line pressure by a pressure regulator valve and then supplied to line pressure fluid passage P1. Manual valve 21 is provided in line pressure fluid passage P1, which is allowed to stroke with mechanical or electrical linkage to a selector lever operation carried out by the vehicle driver. Manual valve 21 switches supply of the line pressure in line pressure fluid passage P1 to establish fluid communication between line pressure fluid passage P1 and drive range fluid passage P2 for the drive range or fluid communication between line pressure fluid passage P1 and reverse range fluid passage P3 for the reverse range in accordance with the range position which is selected via the selector lever. When the drive range, i.e., the forward drive range is selected, manual valve 21 strokes rightward in FIG. 3 and establishes the fluid communication between line pressure fluid passage P1 and drive range fluid passage P2 and the fluid communication between reverse range fluid passage P3 and a drain circuit (as indicated by X in FIG. 3 and hereinafter referred to as the same). As a result, the line pressure can be supplied to low brake L/B or high clutch H/C, and the hydraulic pressure supplied to reverse brake R/B can be discharged. On the other hand, when the reverse range, i.e., the reverse drive range is selected, manual valve 21 strokes leftward in FIG. 3 and establishes the fluid communication between line pressure fluid passage P1 and reverse range fluid passage P3 and the fluid communication between drive range fluid passage P2 and the drain circuit. As a result, the line pressure can be supplied to reverse brake R/B, and the hydraulic pressure supplied to low brake L/B or high clutch H/C can be discharged.

Drive range fluid passage P2 is branched to low brake supply fluid passage P201 for supplying the hydraulic pressure to low brake L/B, and high clutch supply fluid passage P210 for supplying the hydraulic pressure to high clutch H/C.

Low brake supply fluid passage P201 includes outflow side orifice 31 which acts to produce a flow resistance during discharge of the hydraulic pressure and reduce a discharge rate of the hydraulic pressure, and supply bypass fluid passage 202 which bypasses outflow side orifice 31. Check valve 32 is provided in supply bypass fluid passage P202. Check valve 32 operates to allow the hydraulic pressure to be supplied from the side of manual valve 21 but inhibit the hydraulic pressure from being discharged from the side of low brake L/B. Specifically, when supplying the hydraulic pressure to low brake L/B, the hydraulic pressure is positively supplied to low brake L/B through check valve 32 because the flow resistance is high in outflow side orifice 31. In contrast, when discharging the hydraulic pressure from low brake L/B, the oil is prevented from flowing through check valve 32 so that a whole amount of the hydraulic pressure in low brake L/B is slowly discharged through outflow side orifice 31.

Low brake solenoid valve 22 is disposed in low brake supply fluid passage P201. Fluid passage P203 is connected with low brake solenoid valve 22 at one end thereof and with low brake L/B at the other end thereof. Low brake solenoid valve 22 operates to regulate the hydraulic pressure in accordance with a difference in opening degree between low brake supply fluid passage P201 and fluid passage P203 and discharge an excessive amount of the hydraulic pressure from a drain circuit formed in low brake solenoid valve 22. Low brake solenoid valve 22 includes valve body 22b such as a spool, solenoid 22c disposed on one end portion of low brake solenoid valve 22, and coil spring 22a which is disposed on the other end portion of low brake solenoid valve 22 and biases valve body 22b. Solenoid 22c is formed by a combination of an armature and a coil and controls a pressing force which is exerted on valve body 22b in the leftward direction in FIG. 3 by an electromagnetic force which is generated upon being energized. Exerted on valve body 22b at the other end portion of low brake solenoid valve 22 are a biasing force of coil spring 22a and a feedback pressure from feedback fluid passage P204 branched from fluid passage P203 to which the hydraulic pressure regulated by low brake solenoid valve 22 is supplied. Orifice 33 is disposed in feedback fluid passage P204 and acts to suppress vibration in the control system.

With the above-described construction, a balance between the electromagnetic force that is generated in solenoid 22c, and a combined force of the feedback pressure and the biasing force of coil spring 22a is controlled and a desired hydraulic pressure is supplied to low brake L/B. When being energized, low brake solenoid valve 22 operates to connect low brake supply fluid passage P201 and fluid passage P203. When being de-energized, low brake solenoid valve 22 operates to connect low brake supply fluid passage P201 and the drain circuit. Fluid passage P203 includes inflow side orifice 34 which acts to suppress hydraulic vibration and oil hammer, and accumulator 24 which acts to generate a shelf pressure upon supplying the hydraulic pressure and upon discharging the hydraulic pressure.

High clutch supply fluid passage P210 is branched into main fluid passage P211 and high clutch changeover fluid passage P212. Main fluid passage P211 is connected with selector valve 26. High clutch changeover fluid passage P212 is connected to an upper end portion of selector valve 26 as shown in FIG. 3. Similarly, reverse range fluid passage P3 connected to manual valve 21 is branched into main fluid passage P301 and reverse brake changeover fluid passage P302. Main fluid passage P301 is connected with selector valve 26. Reverse brake changeover fluid passage P302 is connected to a lower end portion of selector valve 26 as shown in FIG. 3. Selector valve 26 includes coil spring 26a which is positioned so as to be opposed to high clutch changeover fluid passage P212 and always biases selector valve 26 in one direction of selector valve 26. In other words, high clutch changeover fluid passage P212 and reverse brake changeover fluid passage P302 are connected to selector valve 26 in such an opposed relation that selector valve 26 is interposed therebetween.

Solenoid valve 23 is disposed in fluid passage P213 that is connected to selector valve 26. Fluid passage P214 is connected to solenoid valve 23. Solenoid valve 23 operates to regulate the hydraulic pressure in accordance with a difference in opening degree between fluid passage P213 and fluid passage P214 and discharge an excessive amount of the hydraulic pressure from a drain circuit of solenoid valve 23. Similar to solenoid valve 22, solenoid valve 23 includes a valve body, a solenoid disposed on one end portion of solenoid valve 23 and coil spring 23a disposed on the other end portion thereof. A biasing force of coil spring 23a is exerted on the valve body at the other end portion of solenoid valve 23. Solenoid valve 23 operates to control a pressing force which is exerted on the valve body in the leftward direction in FIG. 3 by an electromagnetic force which is generated upon being energized. When being energized, solenoid valve 23 operates to connect fluid passage P213 and fluid passage P214. When being de-energized, solenoid valve 23 operates to connect fluid passage P213 and the drain circuit. Fluid passage P214 is connected again to selector valve 26 and supplies the oil passing therethrough to either of high clutch fluid passage P215 and reverse brake fluid passage P216 which are connected to selector valve 26.

When the drive range is selected at manual valve 21, selector valve 26 is caused to move downwardly in FIG. 3 by the hydraulic pressure that is supplied to drive range fluid passage P2, and supply the hydraulic pressure to high clutch fluid passage P215 via main fluid passage P211, fluid passage P213, solenoid valve 23 and fluid passage P214. On the other hand, when the reverse range is selected at manual valve 21, selector valve 26 is caused to move upwardly in FIG. 3 by the hydraulic pressure that is supplied to reverse range fluid passage P3, and supply the hydraulic pressure to reverse brake fluid passage P216 via main fluid passage P301, fluid passage P213, solenoid valve 23 and fluid passage P214. Thus, when the drive range is selected at manual valve 21, solenoid valve 23 serves to control the engagement pressure for high clutch H/C. When the reverse range is selected at manual valve 21, solenoid valve 23 serves to control the engagement pressure for reverse brake R/B.

High clutch fluid passage P215 includes orifice 35. Reverse brake fluid passage P216 includes outflow side orifice 36 which acts to produce a flow resistance during discharge of the hydraulic pressure and reduce a discharge rate of the hydraulic pressure, and supply bypass fluid passage P217 which bypasses outflow side orifice 36. Supply bypass fluid passage P217 includes check valve 37 which operates to allow the hydraulic pressure to be supplied from the side of manual valve 21 but inhibit the hydraulic pressure from being discharged from the side of reverse brake R/B. Specifically, when supplying the hydraulic pressure to reverse brake R/B, the hydraulic pressure is positively supplied through check valve 37 because the flow resistance is high at outflow side orifice 36. In contrast, when discharging the hydraulic pressure from reverse brake R/B, the oil is prevented from flowing through check valve 37 so that a whole amount of the hydraulic pressure in reverse brake R/B is slowly discharged through outflow side orifice 36. Fluid passage P218 is connected with supply bypass fluid passage P217 at one end thereof and with reverse brake R/B at the other end thereof. Fluid passage P218 includes inflow side orifice 38 which acts to suppress hydraulic vibration and oil hammer, and accumulator 25 which acts to generate a shelf pressure upon supplying the hydraulic pressure and upon discharging the hydraulic pressure.

[Engagement Control]

Next, engagement control of the apparatus according to the first embodiment is explained. For instance, in a case where the drive range is selected by the vehicle driver and the vehicle is stopped, and after that, shifting from the drive range to the reverse range is selected, the hydraulic pressure in low brake L/B (the hydraulic pressure stored in accumulator 24) is allowed to pass through outflow side orifice 31 and then gradually discharged from the drain circuit of manual valve 21. In other words, in this condition, the hydraulic pressure in low brake L/B is forcibly passed through outflow side orifice 31 to thereby regulate the discharge rate of the hydraulic pressure. Such a state that the hydraulic pressure is slowly discharged is hereinafter referred to as a first discharge state.

At this time, when the reverse range is selected, solenoid valve 23 is energized to connect fluid passage P213 and fluid passage P214 with each other. The hydraulic pressure passing through manual valve 21 and selector valve 26 is flowed through check valve 37 having a relatively small flow resistance and then filled in reverse brake R/B at an appropriate timing. A basic control that is performed upon supplying the hydraulic pressure includes a precharge phase in which a high (or increased) hydraulic pressure supplied is supplied to reverse brake R/B in order to eliminate backlash in the friction engagement element, and an engagement proceeding phase in which after completing the elimination of backlash, a hydraulic pressure gradually increased is supplied to reverse brake R/B to thereby reduce an engagement shock. These phases are attained by the ON-OFF control of solenoid valve 23 and the pressure accumulating function of accumulator 25. Basically, according to the above operation of solenoid valve 23, an engagement force is generated in reverse brake R/B under the condition that the engagement force of low brake L/B is dissipated. Therefore, auxiliary transmission mechanism 9 can be prevented from undergoing a so-called interlock in which auxiliary transmission mechanism 9 is caused to be in a locked state due to both of the friction engagement elements (i.e., low brake L/B and reverse brake R/B) having the respective engagement forces.

However, for instance, in a case where the selecting operation of shifting from the drive range to the reverse range is quickly carried out, or in a case where the selector operation of shifting from the drive range to the reverse range is conducted at a low discharge rate of the oil which is caused due to a low temperature of the oil, there tends to occur such a problem that the hydraulic pressure is early supplied to reverse brake R/B before completely discharging the hydraulic pressure from low brake L/B, thereby causing an interlock in auxiliary transmission mechanism 9. In consideration of this problem, the apparatus according to the first embodiment is constructed such that in a case where supply of the hydraulic pressure to reverse brake R/B has been started before completing release of low brake L/B, discharge rate changeover control for increasing the discharge rate of the hydraulic pressure from low brake L/B is executed.

FIG. 4 is a flowchart showing a routine of the discharge rate changeover control according to the first embodiment. FIGS. 5A and 5B are schematic diagrams showing hydraulic pressure discharging routes, respectively, in a case where the discharge rate changeover control according to the first embodiment is carried out. The discharge rate changeover control is executed in discharge rate changeover control section 104 within engagement control section 103.

As shown in FIG. 4, logic flow starts and goes to step S1 in which it is determined whether or not shifting from the drive range to the neutral range has been selected. When the answer in step S1 is YES, indicating that the shifting from the drive range to the neutral range has been selected, the logic flow goes to step S2. When the answer in step S1 is NO, the logic flow is ended. The determination as to the range shifting is made, for instance, on the basis of a range position signal generated from an inhibitor switch which operates in association with the selector lever and manual valve 21. Accordingly, the determination is made preceding the state that changeover of the fluid passage is actually completed by manual valve 21. In step S2, low brake solenoid valve 22 is switched to the ON state. That is, solenoid 22c of low brake solenoid valve 22 is energized to establish the fluid communication between low brake supply fluid passage P201 and fluid passage P203 and thereby allow the hydraulic pressure to be discharged from the drain circuit of manual valve 21 through outflow side orifice 31 as shown in FIG. 5A.

In step S3, it is determined whether or not release of low brake L/B has been completed. When the answer in step S3 is YES, indicating that the release of low brake L/B has been completed, the logic flow goes to step S5 in which low brake solenoid valve 22 is switched to the OFF state. When the answer in step S3 is NO, indicating that the release of low brake L/B has not been completed, the logic flow goes to step S4. The release of low brake L/B is determined by using timer 105 as shown in FIG. 1. Counting up by timer 105 is started at a time in which a signal indicative of shifting from the drive range to the neutral range is received. In a case where the time counted by timer 105 exceeds a predetermined time value, it is determined that the release of low brake L/B has been completed. In a case where the time counted by timer 105 has not reached the predetermined time value, it is determined that the engagement force still remains in low brake L/B. The release of low brake L/B can also be determined by using an oil pressure switch, a change in speed of the turbine speed sensor or the like, instead of timer 105.

In step S4, it is determined whether or not the precharge phase for reverse brake R/B has been started. When the answer in step S4 is NO, indicating that the precharge phase for reverse brake R/B has not been started, the logic flow goes back to step S2 in which low brake solenoid valve 22 is continuously kept in the ON state. When the answer in step S4 is YES, indicating that the precharge phase for reverse brake R/B has been started, the logic flow goes to step S5 in which low brake solenoid valve 22 is switched to the OFF state regardless of the engagement state of low brake L/B. Specifically, as shown in FIG. 5B, when low brake solenoid valve 22 is in the OFF state, the hydraulic pressure in low brake L/B is discharged through not the drain circuit of manual valve 21 but the drain circuit of low brake solenoid valve 22. As a result, the hydraulic pressure in low brake L/B is discharged without passing through outflow side orifice 31. Therefore, a discharge rate value of the hydraulic pressure which is discharged without passing through outflow side orifice 31 becomes larger than a discharge rate value of the hydraulic pressure which is discharged through outflow side orifice 31. Such a state that the hydraulic pressure in low brake L/B is quickly discharged is hereinafter referred to as a second discharge state.

[Operation of Discharge rate Changeover Control]

Figure 6:
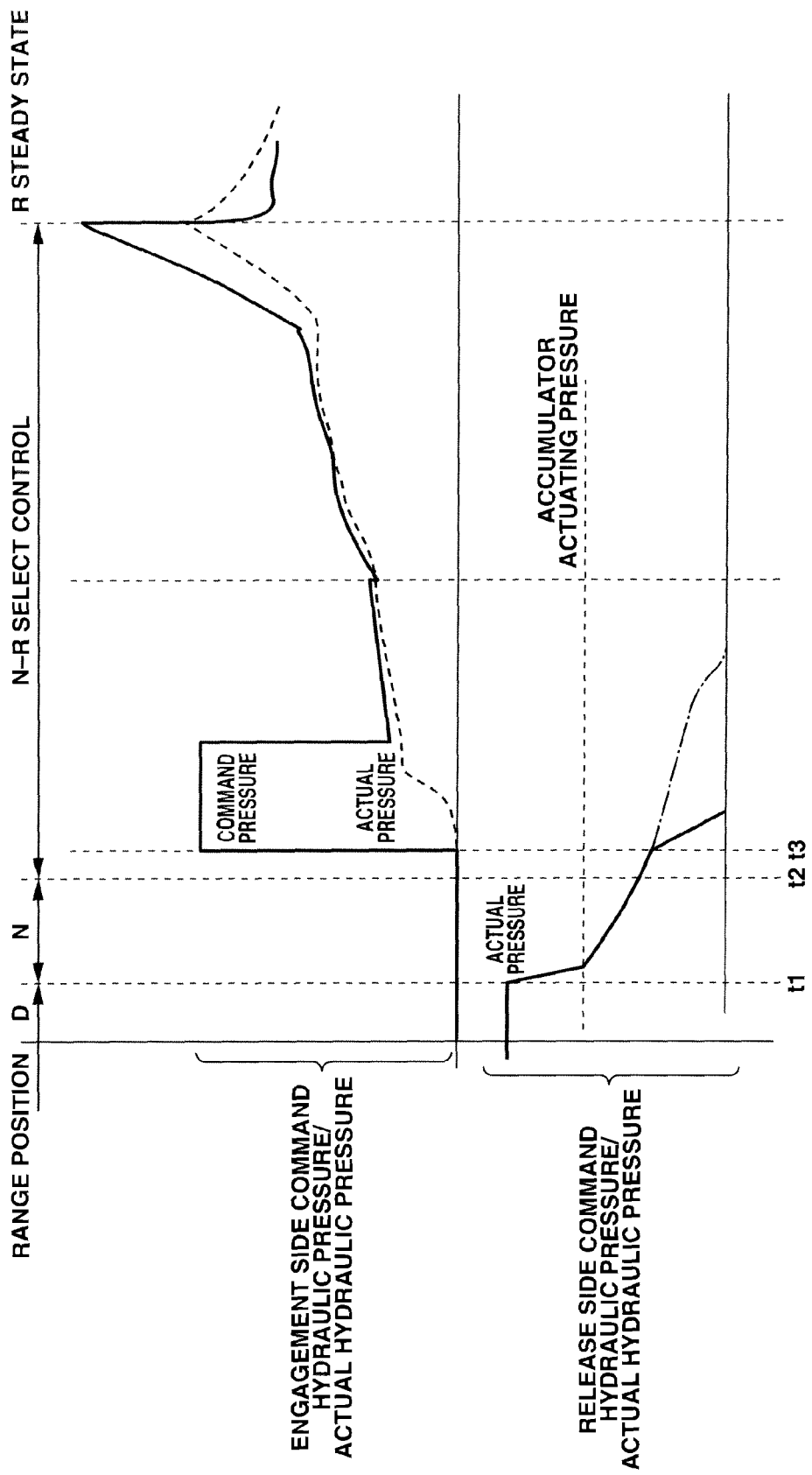
FIG. 6 is a time chart showing a relationship between change in hydraulic pressure and shifting between operating ranges in the apparatus according to the first embodiment in a case where a shifting operation from D range to R range via N range is carried out by a vehicle driver.

Next, an operation of the discharge rate changeover control is explained. FIG. 6 is a time chart showing a relationship between change in hydraulic pressure and shifting between operating ranges in the apparatus according to the first embodiment in a case where a shifting operation from the drive range (D range) to the reverse range (R range) via the neutral range (N range) is carried out by the vehicle driver. In an initial state, the drive range is selected and only low brake L/B is in the engagement state.

At time t1 at which the vehicle driver operates the selector lever so as to perform shifting from the D range to the N range, low brake supply fluid passage P201 is fluidly communicated with the drain circuit of manual valve 21 to thereby temporarily reduce the hydraulic pressure in the low brake to a large extent. After that, when the hydraulic pressure is reduced to an accumulator actuating pressure at which accumulator 24 is actuated while keeping the fluid communication between low brake supply fluid passage P201 and the drain circuit of manual valve 21, the hydraulic pressure in accumulator 24 is discharged to thereby cause gradual reduction of the hydraulic pressure. That is, the discharge rate of the hydraulic pressure is slow. At this time, counting up by timer 105 is started to start monitoring the release state of low brake L/B. At time t2, changeover from the N range to the R range is carried out. At time t3 at which the predetermined time period to establish determination of the range shifting has elapsed, the precharge phase for reverse brake R/B is started and a command to rapidly increase the hydraulic pressure for the precharge to reverse brake R/B is outputted. The rapid increase in the hydraulic pressure causes a quick stroke of a piston of reverse brake R/B, thereby reducing a clearance between clutch plates of reverse brake R/B.

At this time, since the time counted by timer 105 has not reached the predetermined time value, the discharge rate changeover control is started and low brake solenoid valve 22 is switched to the OFF state. Then, the hydraulic pressure that has been discharged from the drain circuit of manual valve 21 through outflow side orifice 31 before switching low brake solenoid valve 22 to the OFF state is discharged from the drain circuit of low brake solenoid valve 22 without passing through outflow side orifice 31. As a result, the discharge rate is increased so that the hydraulic pressure stored in accumulator 24 can be quickly reduced. If low brake solenoid valve 22 is kept in the ON state, the engagement pressure in low brake L/B remains for a long time period due to the operation of accumulator 24 as seen from dashed line in FIG. 6 which indicates a release side hydraulic pressure. In this condition, if an engagement pressure is supplied to reverse brake R/B and the engagement force is generated therein, an interlock will be caused. In contrast, in the apparatus according to the first embodiment, in a case where supply of the hydraulic pressure to reverse brake R/B is started under a condition that the hydraulic pressure remains in low brake L/B, occurrence of an interlock can be avoided by increasing the discharge rate of the hydraulic pressure in low brake L/B.

As explained above, the apparatus according to the first embodiment can attain functions and effects as follows. (1) There are provided low brake L/B (a first friction engagement element) which is brought into an engagement state when the drive range is selected, and brought into a release state when the reverse range is selected, reverse brake R/B (a second friction engagement element) which is brought into a release state when the drive range is selected, and brought into an engagement state when the reverse range is selected, hydraulic pressure control valve unit 10 (a hydraulic pressure control means) which controls supply of the hydraulic pressure to low brake L/B and reverse brake R/B and discharge of the hydraulic pressure therefrom, and discharge rate changeover control section (discharge rate changeover control means) 104 configured to increase a discharge rate value of the hydraulic pressure which is discharged from low brake L/B in a case where when shifting from the drive range to the reverse range is selected, changeover to the reverse range is carried out before completing release of low brake L/B, so as to become larger than a discharge rate value of the hydraulic pressure which is discharged from low brake L/B before carrying out the changeover to the reverse range. With this construction, in a case where shifting from the drive range to the reverse range is quickly selected, or in a case where shifting from the drive range to the reverse range is selected at a low discharge rate of the oil which is caused at a low temperature of the oil, the discharge rate of the hydraulic pressure which is discharged from low brake L/B can be increased to thereby suppress occurrence of an interlock.

(2) Discharge rate changeover control section 104 is configured to increase a discharge rate value of the hydraulic pressure which is discharged from low brake L/B after starting supply of the hydraulic pressure to reverse brake R/B, so as to become larger than a discharge rate value of the hydraulic pressure which is discharged from low brake L/B before starting supply of the hydraulic pressure to reverse brake R/B. That is, the discharge rate is allowed to increase in a case where a probability that an interlock actually occurs slightly later than a time at which the shifting from the drive range to the reverse range is detected becomes high. As a result, it is possible to prolong a time period in which the discharge rate of the hydraulic pressure in low brake L/B is low, and suppress a shock which is caused upon releasing low brake L/B.

(3) Hydraulic pressure control valve unit 10 includes low brake solenoid valve 22 disposed in the fluid passage between low brake L/B and manual valve 21, accumulator 24 disposed in the fluid passage between low brake solenoid valve 22 and low brake L/B, inflow side orifice 34 disposed in the fluid passage between low brake solenoid valve 22 and accumulator 24, outflow side orifice 31 disposed in the fluid passage between manual valve 21 and low brake solenoid valve 22, and check valve 32 which is disposed in parallel with outflow side orifice 31 and operates to allow the hydraulic pressure to bypass outflow side orifice 31 upon supplying the hydraulic pressure to low brake L/B. Low brake solenoid valve 22 is constructed to slide valve body 22b to a predetermined balance position by applying the load that is generated by solenoid 22c to valve body 22b to bear against the feedback pressure of the output pressure and the spring load, and thereby control supplying a hydraulic pressure to low brake L/B and discharging a hydraulic pressure from low brake L/B. Further, low brake solenoid valve 22 is switchable between the first discharge state in which low brake solenoid valve 22 allows the hydraulic pressure to be discharged from manual valve 21 through outflow side orifice 31 and the second discharge state in which low brake solenoid valve 22 allows the hydraulic pressure to be discharged from low brake solenoid valve 22 with bypassing outflow side orifice 31. Discharge rate changeover control section 104 is configured to increase a discharge rate value of the hydraulic pressure which is discharged from low brake L/B by switching low brake solenoid valve 22 from the first discharge state to the second discharge state. Accordingly, the hydraulic pressure in low brake L/B can be quickly discharged with bypassing outflow side orifice 31 only by switching low brake solenoid valve 22 to the OFF state without using a specific orifice bypass valve and the like.

[Second Embodiment]

Figure 7:
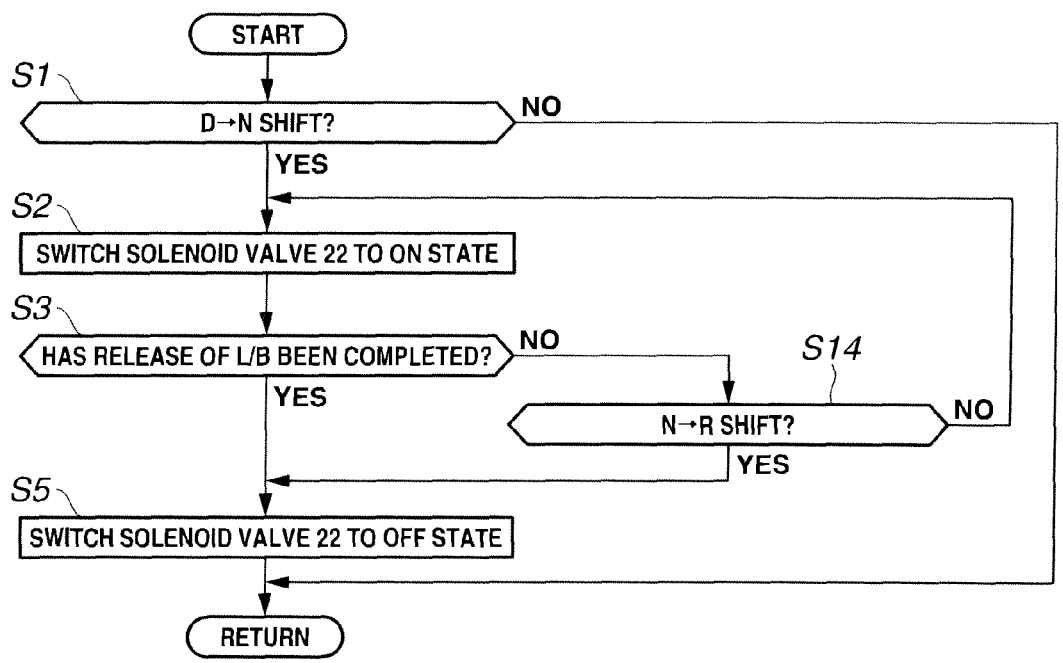
FIG. 7 is a flowchart showing a routine of discharge rate changeover control according to a second embodiment.

Next, the apparatus according to a second embodiment is explained with reference to FIG. 7. FIG. 7 is a flowchart showing a routine of the discharge rate changeover control according to the second embodiment. The apparatus according to the second embodiment has the same basic construction as that of the apparatus according to the first embodiment, but differs in the following from that of the first embodiment. In the discharge rate changeover control according to the first embodiment, changeover in the discharge rate of the hydraulic pressure is performed at the time at which the precharge to reverse brake R/B is started. In contrast, in the discharge rate changeover control according to the second embodiment, changeover in the discharge rate of the hydraulic pressure is performed when changeover to the reverse range has been carried out. In the discharge rate changeover control of the second embodiment, steps S1, S2, S3 and S5 are the same as those of the first embodiment, and therefore, detailed explanations therefor are omitted and only step S14 different from step S4 of the first embodiment is explained.

In step S14, it is determined whether or not changeover or shifting from the neutral range to the reverse range has been carried out. When the answer in step S14 is NO, indicating that the changeover from the neutral range to the reverse range has not been carried out, the logic flow goes back to step S2 in which low brake solenoid valve 22 is continuously kept in the ON position. When the answer in step S14 is YES, indicating that the changeover from the neutral range to the reverse range has been carried out, the logic flow goes to step S5 in which low brake solenoid valve 22 is switched to the OFF state regardless of the engagement state of low brake L/B. That is, as shown in FIG. 5B, the hydraulic pressure in low brake L/B is discharged from not the drain circuit of manual valve 21 but the drain circuit of low brake solenoid valve 22. As a result, the hydraulic pressure in low brake L/B is discharged without passing through outflow side orifice 31, whereby the discharge rate value of the hydraulic pressure which is discharged without passing through outflow side orifice 31 becomes larger than the discharge rate value of the hydraulic pressure which is discharged through outflow side orifice 31.

As explained above, the apparatus according to the second embodiment can attain the following function and effect in addition to the above-described functions and effects (1) and (3) of the apparatus according to the first embodiment.

(4) Discharge rate changeover control section 104 is configured to increase the discharge rate value of the hydraulic pressure which is discharged from low brake L/B after it is determined that the changeover to the reverse range is carried out so as to become larger than the discharge rate value of the hydraulic pressure which is discharged from low brake L/B before it is determined that the changeover to the reverse range is carried out. Specifically, in a case where the changeover to the reverse range has been determined, the discharge rate value of the hydraulic pressure which is discharged from low brake L/B is increased by switching low brake solenoid valve 22 to the OFF state. Accordingly, the hydraulic pressure in low brake L/B can be quickly discharged at an earlier stage than a case where low brake solenoid valve 22 is switched to the OFF state after the precharge to reverse brake R/B is started as explained in the first embodiment. As a result, occurrence of an interlock can be more certainly suppressed.

[Third Embodiment]

Figure 8:
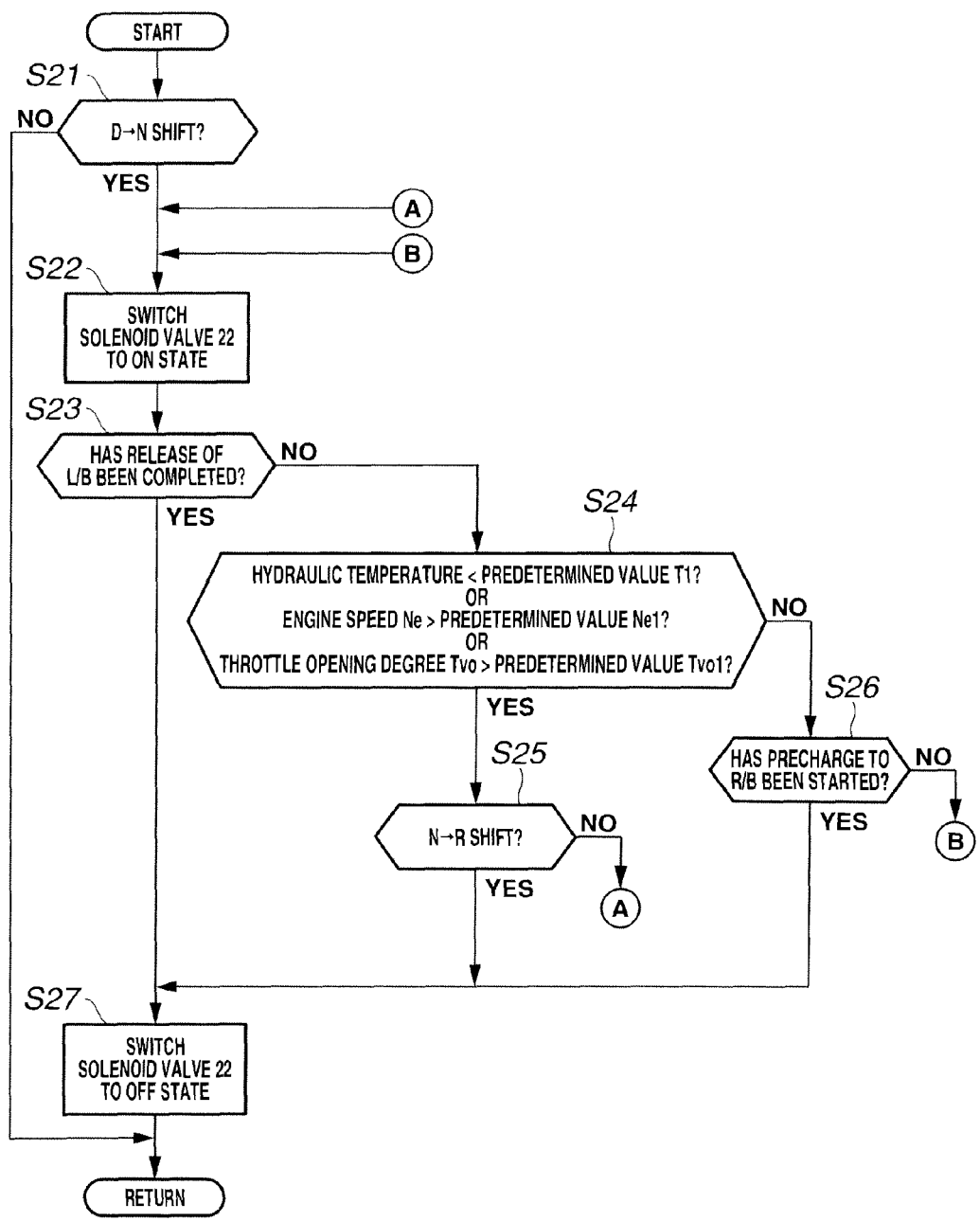
FIG. 8 is a flowchart showing a routine of discharge rate changeover control according to a third embodiment.

Next, the apparatus according to a third embodiment is explained with reference to FIG. 8. FIG. 8 is a flowchart showing a routine of the discharge rate changeover control according to the third embodiment. The apparatus according to the third embodiment has the same basic construction as that of the apparatus according to the first embodiment, but differs in the following from that of the first embodiment. In the discharge rate changeover control according to the first embodiment, in a case where release of the hydraulic pressure in low brake L/B is not completed and the precharge to reverse brake R/B is started, low brake solenoid valve 22 is switched to the second discharge state in which the discharge rate value of the hydraulic pressure is increased. In contrast, in the discharge rate changeover control according to the third embodiment, in a case where a predetermined condition is satisfied and the changeover to the reverse range is carried out even before the precharge to reverse brake R/B is started, low brake solenoid valve 22 is switched to the second discharge state. In a case where the predetermined condition is not satisfied and the precharge to reverse brake R/B is started, low brake solenoid valve 22 is switched to the second discharge state similar to the first embodiment.

As shown in FIG. 8, in step S21, it is determined whether or not shifting from the drive range to the neutral range has been selected. When the answer in step S21 is YES, indicating that the shifting from the drive range to the neutral range has been selected, the logic flow goes to step S22. When the answer in step S21 is NO, the logic flow is ended. The determination as to the range shifting is made, for instance, on the basis of a range position signal generated from an inhibitor switch which operates in association with the selector lever and manual valve 21. Accordingly, the determination is made preceding the state that changeover of the fluid passage is actually completed by manual valve 21.

In step S22, low brake solenoid valve 22 is switched to the ON state. That is, solenoid 22c of low brake solenoid valve 22 is energized to establish the fluid communication between low brake supply fluid passage P201 and fluid passage P203 and thereby allow the hydraulic pressure to be discharged from the drain circuit of manual valve 21 through outflow side orifice 31 as shown in FIG. 5A.

In step S23, it is determined whether or not release of low brake L/B has been completed. When the answer in step S3 is YES, indicating that the release of low brake L/B has been completed, the logic flow goes to step S27 in which low brake solenoid valve 22 is switched to the OFF state. When the answer in step S23 is NO, indicating that the release of low brake L/B has not been completed, the logic flow goes to step S24. The release of low brake L/B is determined by using timer 105, similar to the first embodiment.

In step S24, it is determined whether or not oil temperature T in automatic transmission 4 is lower than predetermined temperature value T1, whether or not engine speed Ne is larger than predetermined speed value Ne1, or whether or not throttle opening degree Tvo is larger than predetermined throttle opening degree value Tvo1. When the answer in step S24 is YES, indicating that either one of these conditions is satisfied, the logic flow goes to step S25. When the answer in step S24 is NO, the logic flow goes to step S26.

In step S25, it is determined whether or not changeover from the neutral range to the reverse range has been carried out. When the answer in step S25 is NO, indicating that the changeover from the neutral range to the reverse range has not been carried out, the logic flow goes back to step S22 in which low brake solenoid valve 22 is continuously kept in the ON state. When the answer in step S25 is YES, indicating that the changeover from the neutral range to the reverse range has been carried out, the logic flow goes to step S27 in which low brake solenoid valve 22 is switched to the OFF state regardless of the engagement state of low brake L/B. That is, as shown in FIG. 5B, the hydraulic pressure in low brake L/B is discharged from not the drain circuit of manual valve 21 but the drain circuit of low brake solenoid valve 22. As a result, the hydraulic pressure in low brake L/B is discharged without passing through outflow side orifice 31, whereby the discharge rate value of the hydraulic pressure which is discharged without passing through outflow side orifice 31 becomes larger than the discharge rate value of the hydraulic pressure which is discharged through outflow side orifice 31.

Specifically, in a case where oil temperature T is lower than predetermined temperature value T1, the discharge of the hydraulic pressure becomes slow, and therefore, an interlock tends to occur. In a case where engine speed Ne is larger than predetermined speed value Ne1, or in a case where throttle opening degree Tvo is larger than predetermined throttle opening degree value Tvo1, a shock that will be caused at the occurrence of interlock becomes large. For this reason, in a case where either one of these conditions is satisfied, low brake solenoid valve 22 is switched to the OFF state to thereby increase the discharge rate of the hydraulic pressure in low brake L/B, when changeover to the reverse range is detected preceding the time at which the precharge to reverse brake R/B is started. As a result, the discharge rate of the hydraulic pressure in low brake L/B can be increased at a timing earlier than a case where low brake solenoid valve 22 is switched to the OFF state when the precharge to reverse brake R/B has been started. Therefore, even in a low oil temperature condition, it is possible to suppress occurrence of an interlock.

In step S26, it is determined whether or not the precharge phase for reverse brake R/B has been started. When the answer in step S26 is NO, indicating that the precharge phase for reverse brake R/B has not been started, the logic flow goes back to step S22 in which low brake solenoid valve 22 is continuously kept in the ON state. When the answer in step S26 is YES, indicating that the precharge phase for reverse brake R/B has been started, the logic flow goes to step S27 in which low brake solenoid valve 22 is switched to the OFF state regardless of the engagement state of low brake L/B. That is, as shown in FIG. 5B, the hydraulic pressure in low brake L/B is discharged from not the drain circuit of manual valve 21 but the drain circuit of low brake solenoid valve 22. As a result, the hydraulic pressure in low brake L/B is discharged without passing through outflow side orifice 31, whereby the discharge rate value of the hydraulic pressure which is discharged without passing through outflow side orifice 31 becomes larger than the discharge rate value of the hydraulic pressure which is discharged through outflow side orifice 31.

As explained above, the apparatus according to the third embodiment can attain the following function and effect.

(5) Discharge rate changeover control section 104 is configured to increase the discharge rate value of the hydraulic pressure which is discharged from low brake L/B after it is determined that the changeover to the reverse range is carried out, so as to become larger than the discharge rate value of the hydraulic pressure which is discharged from low brake L/B before it is determined that the changeover to the reverse range is carried out, in a case where oil temperature T when the shifting from the drive range to the reverse range is selected is lower than predetermined temperature value T1, engine speed Ne when the shifting from the drive range to the reverse range is selected is larger than predetermined speed value Ne1, or throttle opening degree Tvo when the shifting from the drive range to the reverse range is selected is larger than predetermined throttle opening degree value Tvo1. Accordingly, in addition to the above-described functions and effects (1), (2) and (3) of the apparatus according to the first embodiment, the apparatus according to the third embodiment is constructed such that in a case where the predetermined condition as to oil temperature, engine speed or throttle opening degree is satisfied, a timing of the changeover of the discharge rate is allowed to further advance so that occurrence of an interlock and a shock that is caused at the occurrence of an interlock can be suppressed.

The present invention is not limited to the above-described embodiments and other variations of the embodiments can be made. As explained above, the control according to the respective embodiments is performed in the case of shifting from the drive range to the reverse range. However, the control of the present invention can be applied to the case of shifting from the reverse range to the drive range. In such a case, an outflow side orifice is disposed in a fluid passage between solenoid valve 23 and manual valve 21.

Further, as explained above, the control according to the respective embodiments is performed in a case where one of the friction engagement elements is brought into the engagement state and another of the friction engagement elements is brought into the release state, or vice versa upon selecting an operating range. However, the control of the present invention can be applied to a case where one combination of two or more friction engagement elements are brought into the release state and another combination of two or more friction engagement elements are brought into the engagement state, or vice versa upon selecting an operating range.

Furthermore, as explained above, the control according to the first embodiment is performed in the automatic transmission constituted of a continuously variable transmission mechanism and an auxiliary transmission mechanism. However, the control of the present invention is not limited to the above automatic transmission, but can be applied to a continuously variable transmission having a forward/reverse changeover mechanism or can be applied to a stepwise variable transmission only.

This application is based on a prior Japanese Patent Application No. 2009-194036 filed on Aug. 25, 2009.

The entire contents of the Japanese Patent Application No. 2009-194036 is hereby incorporated by reference.

Although the present invention has been described above by reference to certain embodiments of the present invention, the present invention is not limited to the embodiments as described above. Variations of the embodiments and the modification described above will occur to those skilled in the art in light of the above teachings. The scope of the present invention is defined with reference to the following claims.

What is claimed is:

1. A control apparatus for an automatic transmission including a first friction engagement element that is brought into an engagement state upon selecting one of operating ranges including a forward drive range and a reverse drive range and brought into a release state upon selecting the other of the operating ranges, and a second friction engagement element that is brought into a release state upon selecting the one of the operating ranges and brought into an engagement state upon selecting the other of the operating ranges, the control apparatus comprising:

a hydraulic pressure control means for controlling supply of hydraulic pressure to the first friction engagement element and the second friction engagement element and discharge of hydraulic pressure from the first friction engagement element and the second friction engagement; and a discharge rate changeover control means for increasing a discharge rate value of the hydraulic pressure which is discharged from the first friction engagement element in a case where when shifting from the one of the operating ranges to the other of the operating ranges is selected, changeover to the other of the operating ranges is carried out before completing release of the first friction engagement element, so as to become larger than a discharge rate value of the hydraulic pressure which is discharged from the first friction engagement element before the changeover to the other of the operating ranges is carried out.

2. The control apparatus as claimed in claim 1, wherein the discharge rate changeover control means is configured to increase a discharge rate value of the hydraulic pressure which is discharged from the first friction engagement element after supply of the hydraulic pressure to the second friction engagement element is started, so as to become larger than a discharge rate value of the hydraulic pressure which is discharged from the first friction engagement element before supply of the hydraulic pressure to the second friction engagement element is started.

3. The control apparatus as claimed in claim 2, wherein the discharge rate changeover control means is configured to increase a discharge rate value of the hydraulic pressure which is discharged from the first friction engagement element after it is determined that the changeover to the other of the operating ranges is carried out, so as to become larger than a discharge rate value of the hydraulic pressure which is discharged from the first friction engagement element before it is determined that the changeover to the other of the operating ranges is carried out, in a case where an oil temperature when the shifting from the one of the operating ranges to the other of the operating ranges is selected is lower than a predetermined temperature value, an engine speed when the shifting from the one of the operating ranges to the other of the operating ranges is selected is larger than a predetermined speed value, or a throttle opening degree when the shifting from the one of the operating ranges to the other of the operating ranges is selected is larger than a predetermined throttle opening degree value.

4. The control apparatus as claimed in claim 2, wherein control of the supply of the hydraulic pressure to the second friction engagement element includes a precharge phase in which an increased hydraulic pressure is supplied to the second friction engagement element, and an engagement proceeding phase in which a hydraulic pressure gradually increased is supplied to the second friction engagement element.

5. The control apparatus as claimed in claim 1, wherein the discharge rate changeover control means is configured to increase a discharge rate value of the hydraulic pressure which is discharged from the first friction engagement element after it is determined that the changeover to the other of the operating ranges is carried out, so as to become larger than a discharge rate value of the hydraulic pressure which is discharged from the first friction engagement element before it is determined that the changeover to the other of the operating ranges is carried out.

6. The control apparatus as claimed in claim 1, wherein the hydraulic control means comprises a manual valve, a solenoid valve which is disposed in a fluid passage between the first friction engagement element and the manual valve and operates to control supply of the hydraulic pressure to the first friction engagement element and discharge of the hydraulic pressure from the first friction engagement element, an accumulator disposed in a fluid passage between the solenoid valve and the first friction engagement element, an inflow side orifice disposed in a fluid passage between the solenoid valve and the accumulator, an outflow side orifice disposed in a fluid passage between the manual valve and the solenoid valve, and a check valve which is disposed in parallel with the outflow side orifice and operates to allow the hydraulic pressure to bypass the outflow side orifice upon supplying the hydraulic pressure to the first friction engagement element, the solenoid valve is switchable between a first discharge state in which the solenoid valve allows the hydraulic pressure to be discharged from the manual valve through the outflow side orifice and a second discharge state in which the solenoid valve allows the hydraulic pressure to be discharged from the solenoid valve with bypassing the outflow side orifice, and the discharge rate changeover control means is configured to increase the discharge rate value of the hydraulic pressure which is discharged from the first friction engagement element by switching the solenoid valve from the first discharge state to the second discharge state.

7. The control apparatus as claimed in claim 6, wherein the solenoid valve comprises a solenoid, a valve body, and a biasing member which biases the valve body, and the solenoid valve operates to slide the valve body to a predetermined balance position by applying a load which is generated by the solenoid to the valve body against a feedback pressure of an output pressure of the solenoid valve and a load which is generated by the biasing member, and control supply of the hydraulic pressure to the first friction engagement element and discharge of the hydraulic pressure from the first friction engagement element.

8. The control apparatus as claimed in claim 1, wherein the operating ranges further include a neutral range, and the shifting from the one of the operating ranges to the other of the operating ranges or vice versa is carried out via the neutral range.

9. The control apparatus as claimed in claim 8, wherein completion of the release of the first friction engagement element is determined in a case where a time counted by a timer exceeds a predetermined time value.

10. The control apparatus as claimed in claim 9, wherein counting of the timer is started when shifting from the one of the operating ranges to the neutral range or the other of the operating ranges to the neutral range is selected.

* * * * *